United States Patent Office 2,815,379
Patented Dec. 3, 1957

2,815,379

ALICYCLIC KETONE AND INTERMEDIATES FOR THE PREPARATION THEREOF

Joseph Donald Surmatis, Pompton Plains, N. J., assignor to Hoffmann-La Roche Inc., Nutley, N. J., a corporation of New Jersey No Drawing. Application September 13, 1954, Serial No. 455,763

5 Claims. (Cl. 260—587)

This invention relates to novel chemical compounds having utility in the perfume, cosmetic and pharmaceutical industries, for example as odor-imparting agents, and as intermediates for odor-imparting agents and pharmaceuticals; and to novel intermediates and novel processes useful in preparing said compounds. An important aspect of the invention relates to the novel compound 4-(6-ethyl-2,6-dimethyl-1-cyclohexenyl)-3-buten-2-one, and to a process of making the same from the known compound 3-methyl-1-penten-3-ol (which can also be identified as ethyl-methyl-vinyl-carbinol). Because of its pleasant fragrance, reminiscent of violets, but with cedar notes, 4-(6-ethyl-2,6-dimethyl-1-cyclohexenyl)-3-buten-2-one is useful as an odor-imparting agent in the preparation of perfumes and of scented compositions generally.

In one comprehensive embodiment, the invention provides a process for converting the known starting material 3-methyl-1-penten-3-ol to the novel butenone derivative identified above, which comprises the steps of halogenating the 3-methyl-1-penten-3-ol to produce 1-halo-3-methyl-2-pentene, condensing the latter with an acetoacetic acid ester and subjecting the condensation product to ketonic scission to produce 6-methyl-5-octen-2-one, condensing the latter with acetylene to produce 3,7-dimethyl-6-nonen-1-yn-3-ol, hydrogenating the latter to produce 3,7-dimethyl-1,6-nonadien-3-ol, oxidizing the latter to produce 3,7-dimethyl-2,6-nonadien-1-al, condensing the latter with acetone to produce 6,10-dimethyl-3,5,9-dodecatrien-2-one and cyclizing the latter to produce 4-(6-ethyl-2,6-dimethyl-1-cyclohexenyl)-3-buten-2-one.

A preferred method of executing this aspect of the invention comprises the steps of: reacting 3-methyl-1-penten-3-ol with a concentrated aqueous solution of a hydrohalic acid (such as commercial concentrated hydrochloric acid or commercial concentrated hydrobromic acid) thereby producing the corresponding 1-halo-3-methyl-2-pentene; condensing the latter with a lower alkyl acetoacetate (such as ethyl acetoacetate) in the presence of an alkali metal condensation agent (such as sodium) or alternatively in the presence of a corresponding alkali metal alkoxide (such as sodium methoxide) and decarboxylating the resulting condensation product (for example, by saponifying with an alkali metal hydroxide and subsequently acidifying) thereby producing 6-methyl-5-octen-2-one; condensing the latter with acetylene (for example, by reacting with acetylene in liquid ammonia in the presence of an alkali metal condensation agent) thereby producing 3,7-dimethyl-6-nonen-1-yn-3-ol; partially hydrogenating the latter (for example, by reducing with elemental hydrogen in the presence of a hydrogenation catalyst selective to catalyze the hydrogenation of an acetylenic bond preferentially to an olefinic bond) thereby producing 3,7-dimethyl-1,6-nonadien-3-ol; oxidizing the latter (for example, by treating with chromic acid) thereby producing 3,7-dimethyl-2,6-nonadien-1-al; condensing the latter with acetone (for example, by treating with acetone in the presence of a condensation agent such as an alkali metal hydroxide or an aluminum alkoxide) thereby producing 6,10-dimethyl-3,5,9-dodecatrien-2-one; and cyclizing the latter (for example, by treating with sulfuric acid) thereby producing 4-(6-ethyl-2,6-dimethyl-1-cyclohexenyl)-3-buten-2-one.

The illustrative mode of procedure disclosed above can be traced with reference to the following schematic flow sheet:

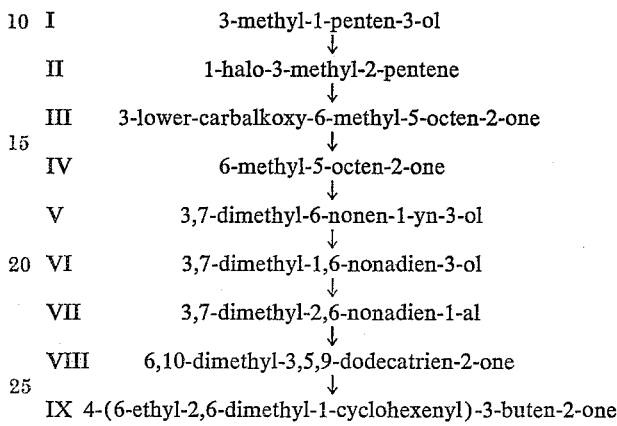

FLOW SHEET

I        3-methyl-1-penten-3-ol
              ↓
II       1-halo-3-methyl-2-pentene
              ↓
III      3-lower-carbalkoxy-6-methyl-5-octen-2-one
              ↓
IV       6-methyl-5-octen-2-one
              ↓
V        3,7-dimethyl-6-nonen-1-yn-3-ol
              ↓
VI       3,7-dimethyl-1,6-nonadien-3-ol
              ↓
VII      3,7-dimethyl-2,6-nonadien-1-al
              ↓
VIII     6,10-dimethyl-3,5,9-dodecatrien-2-one
              ↓
IX   4-(6-ethyl-2,6-dimethyl-1-cyclohexenyl)-3-buten-2-one The novel compounds 6-methyl-5-octen-2-one, 3,7-dimethyl-6-nonen-1-yn-3-ol, 3,7-dimethyl-1,6-nonadien-3-ol, 3,7-dimethyl-2,6-nonadien-1-al and 4-(6-ethyl-2,6-dimethyl-1-cyclohexenyl)-3-buten-2-one are useful as odor-imparting agents in the preparation of perfumes and of scented compositions.

Certain of the compounds of the invention are capable of exhibiting optical isomerism and geometric isomerism. It should be understood that the invention includes all of the stereoisomeric forms of the novel compounds comprised in the foregoing flow sheet. The invention is limited only by the claims.

The invention is further disclosed in the following examples, which are illustrative but not limitative thereof:

*Example 1 (I→II)*

600 g. of 3-methyl-1-penten-3-ol was cooled to +15° C. with an ice bath, then 1800 cc. of concentrated aqueous hydrochloric acid (37%) was poured into the reaction vessel. The mixture was stirred for 30 minutes. The oil, comprising essentially 1-chloro-3-methyl-2-pentene, was separated, washed three times with 500 cc. of water and dried over calcium chloride.

*Example 2 (II→III→IV)*

Four liters of benzene, 1040 g. of ethyl acetoacetate and 378 g. of sodium methylate were stirred into a 12 liter flask. 696 g. of 1-choro-3-methyl-2-pentene as produced in Example 1 was added from a separatory funnel in 2 hours at 60° C. The stirring was then continued at 60° C. overnight.

The mixture was diluted with four liters of water. The oil was separated and the benzene was distilled off under vacuum. The thick residue, 3-carbethoxy-6-methyl-5-octen-2-one, was placed in a 5 liter flask with 2 liters of ethyl alcohol, 1 liter of water and 500 grams of potassium hydroxide. This was stirred for two hours, then allowed to set overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water washed and fractionated to yield 6-methyl-5-octen-2-one, distilling at 65° C./10 mm., $n_D^{25}$=1.4412. This compound has an odor generally reminiscent of citrus fruit.

*Example 3 (IV→V)*

84 g. of metallic sodium was dissolved in 3 liters of liquid ammonia. Acetylene was bubbled into the stirred solution until its color changed from blue to a white. 420 g. of 6-methyl-5-octen-2-one was dissolved in 500 cc. of diethyl ether and dropped into the stirred reaction mixture in one hour. Stirring was then continued for 3 hours while a slow stream of acetylene was bubbled in. The acetylene was then stopped, but the stirring was continued for about 15 hours. The ammonia was then distilled off and the residue in the reaction vessel was washed with 2 liters of 5% aqueous sulfuric acid. The product was then water washed, dried over anhydrous calcium sulfate and fractionated to yield 3,7-dimethyl-6-nonen-1-yn-3-ol, distilling at 89° C./10 mm., $n_D^{25}$=1.4612. This compound has an odor generally reminiscent of bergamot.

*Example 4 (V→VI)*

300 g. of 3,7-dimethyl-6-nonen-1-yn-3-ol, 30 g. of 5% lead-palladium-calcium carbonate catalyst [Lindlar, Helvetica Chimica Acta 35, 446 (1952)] and 300 cc. of petroleum ether were placed in a flask provided with a stirrer and hydrogenated at 25-30° C. at one atmosphere hydrogen pressure until 1.9 mols of hydrogen were consumed. Fractionation of the product gave 3,7-dimethyl-1,6-nonadien-3-ol distilling at 132° C./86 mm., $n_D^{25}$=1.4603. This compound has an odor generally reminiscent of citrus fruit.

*Example 5 (VI→VII)*

In a flask fitted with a stirrer, thermometer, dropping funnel, and a cold water bath, were placed 1500 cc. of water, 250 g. of sodium dichromate, 125 cc. of glacial acetic acid, 200 cc. of benzene, and 125 g. of 3,7-dimethyl-1,6-nonadien-3-ol. To the stirred reaction mixture was added a solution of 125 cc. of concentrated sulfuric acid in 400 cc. of water over a period of two hours. During the addition, the temperature was controlled at 40° C. The stirring was continued for an additional hour; then one liter of water was added. The oil layer was removed with a separatory funnel, and the aqueous layer was extracted with 400 cc. of benzene. The oil and benzene extracts were combined and washed until neutral. The oil was distilled through a column under vacuum. The product, 3,7-dimethyl-2,6-nonadien-1-al, distilled at 135-137° C./25 mm., $n_D^{25}$=1,4830. The semicarbazone derivative melted at 159° C. The 3,7-dimethyl-2,6-nonadien-1-al has an odor reminiscent of lemongrass oil.

*Example 6 (VII→VIII)*

45 g. of 3,7-dimethyl-2,6-nonadien-1-al, 50 g. of aluminum isopropylate, 600 cc. of acetone and 600 cc. of benzene were placed in a 2-liter flask and stirred at reflux temperature for 24 hours. The cooled reaction mixture was washed first with dilute hydrochloric acid and finally with water until neutral. The benzene was distilled off, and the product was fractionated under high vacuum, the desired product 6,10-dimethyl-3,5,9-dodecatrien-2-one being obtained in a fraction distilling at 102-103° C./0.2 mm., $n_D^{25}$=1.5223. The 2,4-dinitrophenylhydrazone derivative melted at 117° C.

*Example 7 (VII→VIII, alternate)*

To a solution of 100 g. of 3,7-dimethyl-2,6-nonadien-1-al, 300 g. of acetone and 40 g. of water, there was added, with vigorous stirring, 18 g. of 50% aqueous sodium hydroxide solution at 16-18° C. The mixture was stirred for 72 hours under nitrogen, then neutralized with 20% aqueous sulfuric acid at —5° C. The product was extracted with benzene, water-washed and fractionated. 6,10-dimethyl-3,5,9-dodecatrien-2-one was obtained in a fraction distilling at 102-103° C./0.2 mm., $n_D^{25}$=1.522-1.523

The 2,4-dinitrophenylhydrazone crystallized as red needles, M. P. 117° C.

*Example 8 (VIII→IX)*

A solution of 350 g. of concentrated sulfuric acid and 75 g. of glacial acetic acid was cooled to —30° C. 100 g. of 6,10-dimethyl-3,5,9-dodecatrien-2-one was added dropwise in 45 minutes, keeping the temperature at —20 to —30° C. The stiff reddish colored mixture was warmed up to 0° C. and stirred for 10 minutes. This was then poured onto 1500 g. of crushed ice. The product was extracted with toluene, washed with water, then with 20% aqueous sodium hydroxide solution, and finally with a saturated sodium chloride solution containing a few drops of acetic acid. On fractionation, 4-(6-ethyl-2,6-dimethyl-1-cyclohexenyl)-3-buten-2-one was obtained in a fraction distilling at 86.5-87.0° C./0.3 mm., $n_D^{25}$=1.5165. This compound has an odor reminiscent of violets, but with cedar notes. The 2,4-dinitrophenylhydrazone melted at 126° C.

I claim:
1. 6-methyl-5-octen-2-one.
2. 3,7-dimethyl-6-nonen-1-yn-3-ol.
3. 3,7-dimethyl-1,6-nonadien-3-ol.
4. 3,7-dimethyl-2,6-nonadien-1-al.
5. 4 - (6 - ethyl - 2,6 - dimethyl - 1 - cyclohexenyl)-3-buten-2-one.

References Cited in the file of this patent

UNITED STATES PATENTS

| | | |
|---|---|---|
| 2,333,216 | Trieschmann et al. | Nov. 2, 1943 |
| 2,589,275 | Naves | Mar. 18, 1952 |
| 2,606,930 | Heilbron et al. | Aug. 12, 1952 |

FOREIGN PATENTS

| | | |
|---|---|---|
| 665,147 | Great Britain | Jan. 16, 1952 |

OTHER REFERENCES

Fieser et al.: Organic Chemistry, 1944, pp. 314 and 987.
Simonsen et al.: The Terpenes, vol. I, 2nd ed., p. 61 (1947).
Moncrieff: The Chemistry of Perfumery Materials, p. 99 (1949).
West et al.: Synthetic Perfumes, p. 176 (1949).
Simonsen et al.: The Terpenes, vol. III, pp. 497-498 (1951).
Sondheimer: J. Am. Chem. Soc., vol. 74, pp. 4040-4043 (1952).